United States Patent [19]
McKewan

[11] Patent Number: 4,586,861
[45] Date of Patent: May 6, 1986

[54] CONVEX WEDGE RAMP THREAD CONFIGURATION

[75] Inventor: Arthur J. McKewan, Rochester, Mich.

[73] Assignee: Microdot Inc., Darien, Conn.

[21] Appl. No.: 173,110

[22] Filed: Jul. 28, 1980

Related U.S. Application Data

[63] Continuation of Ser. No. 958,356, Nov. 6, 1978, abandoned.

[51] Int. Cl.⁴ .............................................. F16B 39/30
[52] U.S. Cl. ...................................................... 411/311
[58] Field of Search ................ 411/308, 309, 310, 311

[56] References Cited

U.S. PATENT DOCUMENTS

| | | | |
|---|---|---|---|
| 658,085 | 9/1900 | Higbee | 411/366 |
| 1,657,244 | 1/1928 | Dardelet | 411/308 |
| 1,697,118 | 1/1929 | Hoke | 411/277 |
| 1,702,878 | 2/1929 | Mersfelder et al. | 411/265 |
| 1,798,604 | 3/1931 | Hoke | 411/222 |
| 1,817,295 | 8/1931 | Dardelet | 411/308 |
| 1,828,856 | 10/1931 | Bridges | 411/308 |
| 1,884,973 | 10/1932 | Hoke | 411/311 |
| 1,893,067 | 1/1933 | Arenz | 411/304 |
| 1,905,869 | 4/1933 | Hoke | 411/222 |
| 1,946,860 | 2/1934 | Kielland | 411/308 |
| 1,961,003 | 5/1934 | Lamond | 10/141 |
| 1,981,399 | 11/1934 | Thomson | 411/366 |
| 2,091,788 | 8/1937 | McManus | 411/308 |
| 2,371,365 | 3/1945 | Tomalis et al. | 411/310 |
| 2,405,402 | 8/1946 | Carter | 411/287 |
| 2,437,638 | 3/1948 | Evans | 411/311 |
| 2,473,752 | 6/1949 | Johnson | 411/259 |
| 2,581,690 | 1/1952 | Moehle et al. | 411/308 |
| 2,788,045 | 4/1957 | Rosan | 411/277 |
| 2,842,180 | 7/1958 | Brown et al. | 411/285 |
| 3,050,318 | 8/1962 | Van Der Wissel | 411/309 |
| 3,125,772 | 3/1964 | Beck | 10/111 |
| 3,247,877 | 4/1966 | Evans | 411/311 |
| 3,342,234 | 9/1967 | Evans | 411/311 |
| 3,346,278 | 10/1967 | Yocum | 411/307 |
| 3,353,581 | 11/1967 | Evans | 411/311 |
| 3,385,340 | 5/1968 | Evans | 411/310 |
| 3,446,262 | 5/1969 | Phippard | 411/257 |
| 3,927,503 | 12/1975 | Wilson | 411/311 |
| 4,076,064 | 2/1978 | Holmes | 411/285 |

FOREIGN PATENT DOCUMENTS

| | | |
|---|---|---|
| 27170 | 12/1930 | Australia . |
| 29632 | 5/1925 | France . |
| 600631 | 11/1925 | France . |
| 720079 | 11/1931 | France . |
| 40199 | 1/1932 | France . |
| 73897 | 6/1929 | Sweden . |
| 129892 | 10/1950 | Sweden . |
| 26071 | of 1913 | United Kingdom . |
| 331387 | 7/1930 | United Kingdom . |
| 335598 | 9/1930 | United Kingdom . |

OTHER PUBLICATIONS

World Screw Thread Forms American Machinist/Metal Working Manufacturing 6/12/1961, p. 129; 6/26/1961, pp. 93, 95; 7/10/1961; p. 111; 7/24/1961, pp. 105, 107; 8/21/1961, pp. 119, 121.

Primary Examiner—Thomas J. Holko
Attorney, Agent, or Firm—Lyman R. Lyon

[57] ABSTRACT

An internal thread configuration for use in nuts and threaded holes has a wedge ramp root section that is convexly curved so that a portion thereof is substantially parallel to the axis of the threads.

1 Claim, 5 Drawing Figures

CONVEX WEDGE RAMP THREAD CONFIGURATION

This is a continuation of application Ser. No. 958,356, filed Nov. 6, 1978, now abandoned.

BRIEF SUMMARY OF THE INVENTION

It is the purpose of this invention to improve the vibration resistance of the wedge ramp type internal thread construction.

The invention accomplishes this purpose by means of a wedge ramp root section that is primarily a convexly curved surface with a portion that is preferably substantially parallel to the thread axis.

DESCRIPTION OF THE INVENTION

Figure 1:
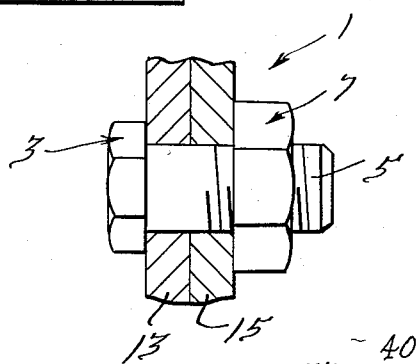
FIG. 1 is a cross section through a threaded assembly of the type that may use the present thread configuration.

A threaded fastener assembly 1 includes a bolt 3 with external helical threads 5 that mate with internal helical threads in a nut 7. When torque is applied to the hex head 9 of the bolt 3 and the hex body of the nut 7, the bearing surfaces at the bottom of each are drawn toward each other to clamp parts 13 and 15 together.

Figure 2:
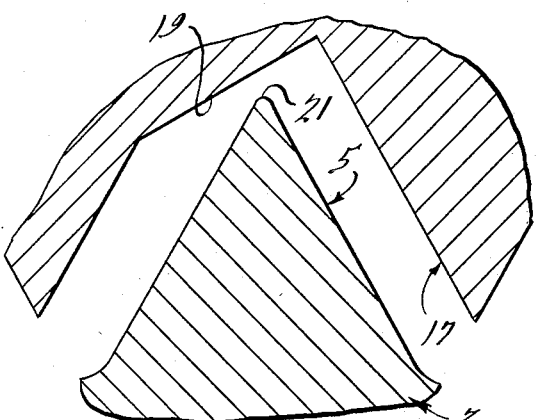
FIG. 2 is an enlarged cross section through a prior art assembly of internal and external threads that may be used in the nut and bolt of FIG. 1 and shows a straight wedge ramp that is a nominal ramp for the curved ramp of the invention.

The assembly 1 may in use be subjected to vibratory loads or to alternating transverse loading. Such loads will tend to work the threads loose so that the parts 13 and 15 become, in effect, unclamped. FIG. 2 shows a known thread form that has been used to improve resistance to loosening under such loads. It comprises a helical internal V-shape thread configuration 17 having a wedge ramp root section 19 and is shown in loose assembly with the standard symmetrical V-shape external thread configuration 5 of bolt 3. If torque is applied, the crest 21 of the thread 5 is pulled against the straight wedge ramp 19 to reduce lateral thread clearances and the tendency of the threads to move laterally and loosen when subjected to vibrating or alternating loads. The present invention involves a change in shape of the wedge ramp 19.

Figure 3:
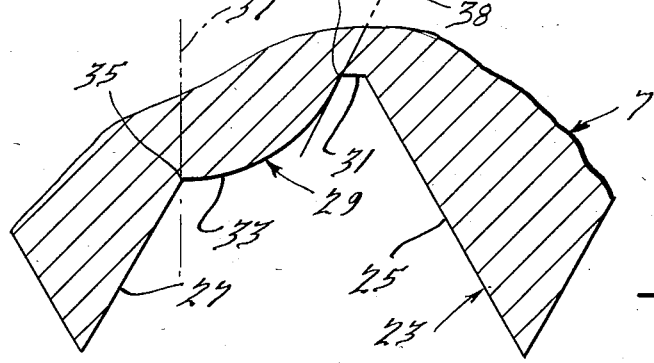
FIG. 3 is an enlarged cross section of an internal thread configuration according to the present invention.
Figure 4:
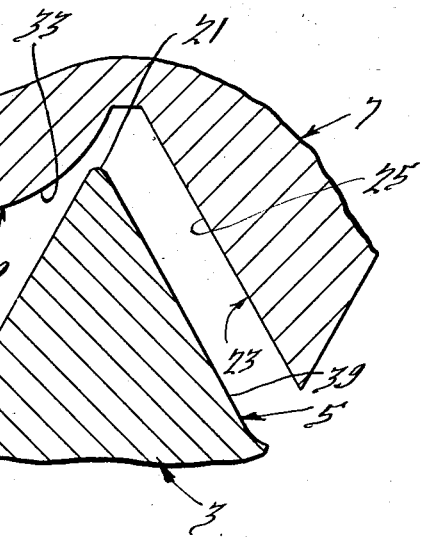
FIG. 4 is an enlarged cross section of the internal thread of FIG. 3 in loose assembly with an external thread of the bolt of FIG. 1.
Figure 5:
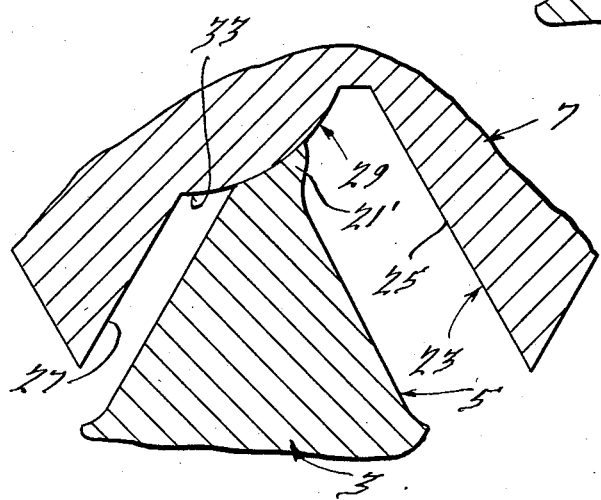
FIG. 5 is a section similar to FIG. 4 but showing the assembly under load.

Referring to FIGS. 3-5, the nut 7 has an internal thread shape 23 generally similar to the thread 17. Thread 23 includes a leading flank 35 and a following flank 27, both preferably having 30° flank angles and defining a 60° thread angle. The outer radial ends of the flanks are axially separated and connected by the modified wedge ramp root section 29. The section 29 has a short tool clearance section 31 parallel to the thread axis to facilitate taping but the operative portion is the convexly curved ramp surface 33 that replaces the straight ramp of FIG. 2. This intersects the following flank 27 at sharp point 35 and at this point a tangent is substantially parallel to the thread axis. The curvature of surface 33 may be formed as an arc struck by a radius extending from a center on imaginary line 37 through intersection 35 and perpendicular to the axis of the threads.

The external bolt thread 5 has a leading flank 39 and a following flank 41. They preferably have the same flank angles and these are preferably the same as the flank angles for internal flanks 25 and 27. The crest 21 joins the flanks 39 and 41; and, while it is shown as rounded, it could be sharp or it could be a straight wedge ramp that is complementary to ramp section 19, i.e., perpendicular to flank 39.

FIG. 4 illustrates a loose assembly of the threads 5 and 23, corresponding to FIG. 2. When torque is applied to tighten the bolt 3 and nut 7, the external thread 5 will be pulled against the concave ramp portion 33. As torque increases, the crest of the thread 5 will gradually be elastically and/or plastically deformed and molded to the contour of the ramp 29 as illustrated at 21' in FIG. 5. While this is taking place, there is a powerful wedging and centering action between the threads serving to reduce lateral clearance and susceptibility to loosening. When the crest 21 is molded to the following portion of the convex ramp 33, as is commencing in the position of FIG. 5, the engagement is along lines of tangency that are approaching a parallel to the thread axis. Friction is therefore very high and resistance to relative lateral motion becomes substantially infinite, subject primarily to the elastic limits of the materials. The load is applied to the internal threads at its root section where it is acting against the hoop strength of the nut rather than as a bending load on the flank 27. Thus, the assembly of FIG. 5 will have an extremely high resistance to loosening under even vibratory or alternating lateral loads.

In summary, the threaded fastener assembly 1 of the instant invention comprises a bolt 3 having a standard thread, and a nut 7 having a helical internal thread 23. The internal thread 23 has angularly related leading and following flanks 25 and 27, respectively, with a radially inwardly convex ramp 29 therebetween. The ramp 29 comprises a smooth uninterrupted arc 33 of a circle in radial cross section the axis of generation of which lies in a plane 37 extending generally normal to the central axis of the nut 7 and through a first point 35 at the intersection of the ramp 29 with the following flank 27. A tangent, shown as a broken line 38, to the arcuate ram 29 drawn through a second point 40 adjacent the root portion 31 extends at an angle axially spaced from and substantially parallel to the following flank 27. The tangent also lies within the included angle between the leading and following flanks 25 and 27, respectively. The second point 40 on the ramp 29 is spaced radially outwardly from the crest 21 of the thread on the bolt 3 whereby the bolt 3 is initially free running within the nut 7. Engagement of the crest 21 of the thread 5 on the nut 3 with the ramp 29 is at successively decreasing angles relative to the central axis of the nut 7 upon movement of the crest 21 of the bolt 3 toward the following flank 27 of the nut 7.

While the internal threads 23 are shown in connection with the nut 7, it will be understood that they can be formed in blind holes, large forgings, castings, and other parts not ordinarily referred to as a nut. Modifications in the particular structures shown may be made without departing from the spirit and scope of the invention.

I claim:

1. A threaded connection comprising an externally threaded member having a standard thread, and an internally threaded member comprising a body having an aperture with a central axis and a helical internal thread on the internal periphery thereof, said internal thread having angularly related leading and following flanks with a radially inwardly convex ramp at the root therebetween, said ramp comprising a smooth uninterrupted arc of a circle in radial cross section the axis of generation of which lies in a plane extending generally normal to the central axis of said internally threaded member and through a first point at the intersection of said arcuate ramp with said following flank, a tangent to said arcuate ramp drawn through a second point at an opposite end thereof from said first point extending at an angle axially spaced from and substantially parallel to said following flank and lying within the included angle between said leading and following flanks, said second point on said ramp being spaced radially outwardly from the crest of the thread on said externally threaded member whereby said externally threaded member is initially free running relative to said internally threaded member, engagement of the crest of the thread on said externally threaded member with said ramp being at a successively decreasing angle relative to the central axis of said internally threaded member upon movement of said crest toward the following flank of said internally threaded member.

* * * * *